Sept. 17, 1957 W. J. STECKER 2,806,371
TESTING DEVICE FOR HOLLOW ARTICLES
Filed Nov. 26, 1952 2 Sheets-Sheet 1

INVENTOR
WALTER JULIUS STECKER
By *Gravely, Siedy, Woodruff & Dees*
ATTORNEYS

Sept. 17, 1957 W. J. STECKER 2,806,371
TESTING DEVICE FOR HOLLOW ARTICLES
Filed Nov. 26, 1952 2 Sheets-Sheet 2
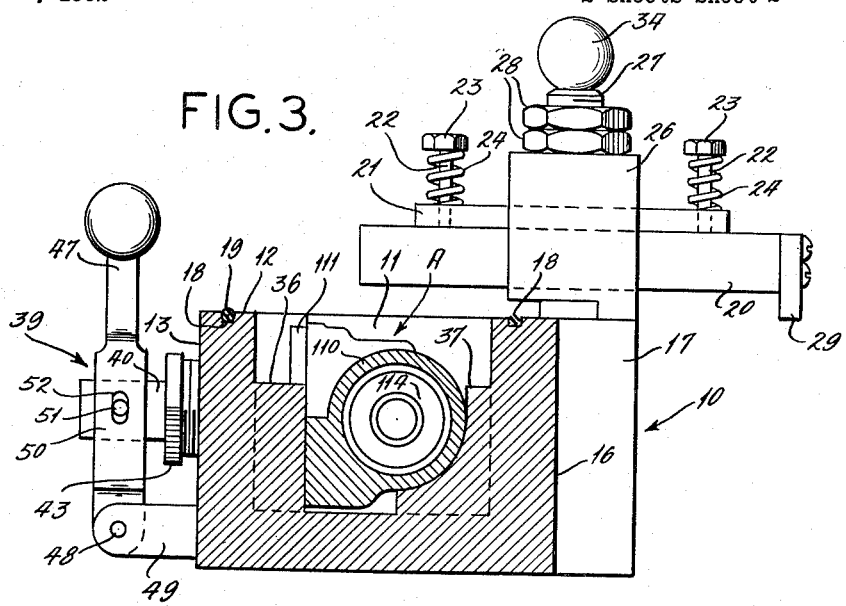
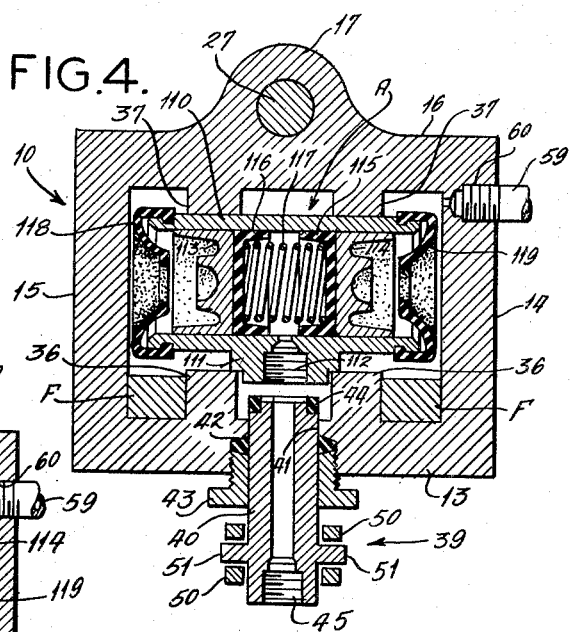
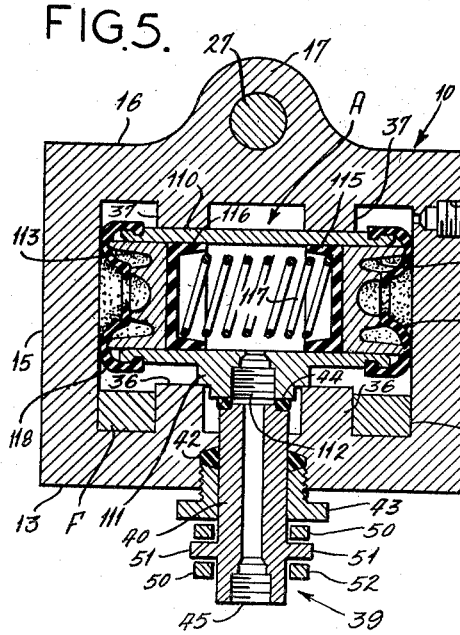
INVENTOR
WALTER JULIUS STECKER
By Gravely, Lieder, Woodruff & Dees
ATTORNEYS.

United States Patent Office 2,806,371
Patented Sept. 17, 1957

2,806,371

TESTING DEVICE FOR HOLLOW ARTICLES

Walter Julius Stecker, Pagedale, Mo., assignor to Wagner Electric Corporation, St. Louis, Mo., a corporation of Delaware Application November 26, 1952, Serial No. 322,691

4 Claims. (Cl. 73—49.2)

This invention relates to improvements in devices for testing hollow articles, cast bodies and the like, and more particularly to a testing device having pressure sensitive indicator means for testing sealed articles, castings and the like for leaks.

It is well known that the sealing means for hollow articles under fluid pressure must be considerably more certain where the fluid is a gas than where the fluid is a liquid. Heretofore, testing devices for sealed hollow articles have made use of the liquid submergence method in which a leak may be detected by bubbles appearing on the surface of the liquid. This is a particularly messy testing procedure and is not suitable to high speed production requirements. It is particularly unsuited for the testing of hollow articles of cast construction where it is necessary or desirable to test the casting for porosity defects. In other cases, the liquid submergence method cannot be used at all.

It is an object of the present invention to provide a device for pressure testing sealed hollow articles, casting and the like which is exceedingly sensitive in its response to leakage in the article being tested.

Another object of the present invention is to provide a device for pressure testing the internal spaces of hollow articles which is adapted to high speed production and is positive in its indication of the presence of leaks.

It is another object of this invention to provide a device for testing hollow articles which utilizes a gaseous fluid under controlled differential pressure conditions to thereby increase the scope of its usefulness and avoid the objections to liquid submergence testing devices.

The present invention consists in a testing device having a test article receiving chamber which can be sealed at known or preferably at substantially atmospheric pressure and means for introducing fluid under pressure to the interior of the article to be tested, the article being first placed in the sealed chamber. The internal pressure creates a difference of pressures between the interior of the article and the chamber surrounding the article which may be easily watched by means of a manometer to detect the presence of leaks. Since the only source of pressure fluid for the chamber is the interior of the article being tested, any leakage out of the article increases the pressure in the surrounding space of the chamber and changes the height of the liquid column in the manometer so that a positive indication can be made of the presence or absence of leaks in the article.

The invention further consists in the parts and combination of parts hereinafter to be described in connection with the accompanying drawings, wherein:

Fig. 3 is a sectional elevational view of the article testing device as seen at line 3—3 in Fig. 1;

Fig. 4 is a sectional plan view of the testing device showing an article in position to be tested, the view being taken at line 4—4 in Fig. 1; and Fig. 5 is a view similar to Fig. 4 wherein the device and the article therein are shown in test position.

Figure 1:
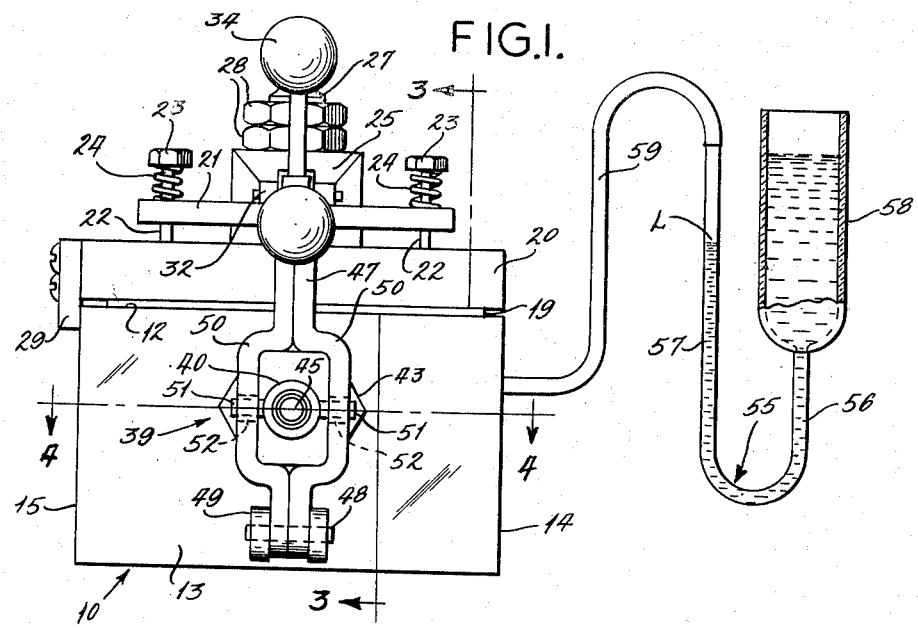
Fig. 1 is a front elevational view of the device for testing hollow articles.
Figure 2:
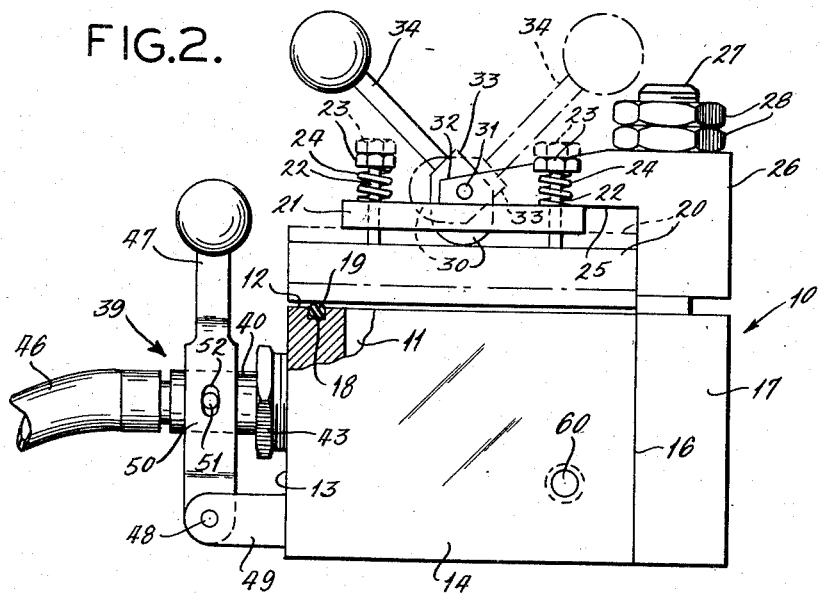
Fig. 2 is a side elevational view of the device.

First referring to Figs. 1, 2 and 3, a preferred embodiment of the present invention includes a container 10 having the interior chamber 11 which is open at the upper face 12. The container 10 has a front wall 13 opposite side walls 14 and 15 and a rear wall 16 provided with an extension 17. The upper face 12 of the container is provided with a channel or groove 18 to receive a sealing strip 19 of any suitable cross sectional shape. In the sample shown, the seal 19 is circular in cross section. A cover 20 fits over the open face 12 of the container 10 and rests upon the sealing means 19 so that the chamber 11 can be fully sealed.

The testing device is adapted for relatively high speed production testing of hollow articles as compared with immersion testing methods. To this end, cover 20 is connected to a supporting plate 21 by means of a plurality of studs 22 slidable in suitable apertures in the plate 21. Each of the studs 22 is provided with a removable head 23 for retaining a pressure spring 24 about the stud 22 and against the plate 21. Plate 21 is fixed to the projecting arm 25 of a cover bracket 26. The bracket 26 is pivoted on a suitable pivot stud 27 which is fixed in the projection 17 of the rear wall 16 of the container 10. A pair of jam nuts 28 engage the upper end of the pivot stud 27 to hold the bracket 26 in proper position for pivoting movement in a plane above the face 12 of the container. One edge of the cover 20 is provided with a stop plate 29 for the purpose of locating the cover in position over the face 12 and against the sealing means 19.

The cover 20 is normally held in its elevated position against the supporting plate 21 by means of springs 24 pushing against the stud heads 23. In the raised position of the cover, the bracket 26 may be pivoted to one side to swing the cover away from the opening of the chamber 11. This greatly facilitates and speeds up the operation of placing articles in the chamber 11 or of removing them. Means for holding the cover 20 in closed position over chamber 11 consists of a cam 30 mounted on pivot pin 31 in the bifurcated end 32 of the arm 25. Cam 30 is provided with a suitable boss 33 to receive a lever 34 for operating the cam 30 from the full line position shown in Fig. 2, wherein cover 20 is held closed, to the dotted line position shown thereof.

The interior of chamber 11 is provided with suitable ribs 36 projecting inwardly from the front wall 13 and cooperating ribs 37 projecting inwardly from the opposite, rear wall 16. These ribs 36 and 37 are suitably formed to receive the article A which is to be tested. In the present embodiment, the device is shown to be adapted for testing the wheel cylinders of automotive brake systems. It is understood, however, that this invention is not to be limited to articles of this type. The wheel cylinder has been selected for purposes of describing one article which is suitable for this testing device. A wheel cylinder body 110 is generally formed with a boss 111 at one side provided with a threaded port 112 to which the usual hydraulic supply line is connected. The cylinder 110 contains a pair of oppositely positioned plungers 113 and 114 movable toward and away from a central position adjacent the port 112. These plungers are sealed at the inner side thereof by sealing cups 116 and 115 respectively, with the aid of a relatively weak spring 117 located between the cups 115 and 116 for urging the plungers 113 and 114 outwardly in the cylinder. Flexible boots 118 and 119 are placed over the ends of the cylinder 110 respectively adjacent the plungers 113 and 114. These boots serve to prevent the entry of foreign matter, such as dirt and water, into the cylinder when installed on a vehicle. In the present embodiment, article A is placed in chamber 11 with the body 110 resting in suitable cutouts in ribs 37 and with boss 111 resting between ribs 36.

In order to be able to supply fluid under pressure to the interior of article A, a coupling device 39 is located in the wall 13 of container 10 so as to register with the inlet port 112. This device consists in a sleeve 40 slidably mounted in a port 41 in wall 13 and sealed therein by means of the packing ring 42 and the threaded gland 43. The inner end of sleeve 40 is provided with a suitable sealing ring 44 which engages the boss 111 of article A closely about the inlet port 112 thereof. The outer end of sleeve 40 has a threaded port 45 to which is connected a conduit 46 (Fig. 2) leading to a source (not shown) of fluid under pressure. Means for reciprocating sleeve 40 (Figs. 2 and 3) consists in a lever 47 pivoted at element 48 in a bracket 49 attached to the wall 13 of container 10. Lever 47 is provided with complementary members having offset portions 50 (Fig. 1) which pass on opposite sides of the sleeve 40 and engage projections 51 formed on said sleeve. Each of the offset portions 50 of the lever 47 has an aperture 52 which loosely receives the projections 51, that is in the direction at substantially right angles to the axis of pin 51, in order to allow for the arcuate travel of the lever 47 relative to the straight line travel of sleeve 40.

Means for indicating the pressure condition within chamber 11 comprises a manometer, Fig. 1. The manometer has a U-shaped tube 55 with the spaced legs 56 and 57 extending upwardly. Leg 56 is connected to a reservoir 58 containing a quantity of mercury or other manometer fluid. The opposite leg 57 is connected by a suitable conduit 59 to the port 60 provided in wall 14 of the container 10. Port 60 opens into the chamber 11 and communicates the pressure of chamber 11 through conduit 59 to the leg 57 of the manometer, thereby to affect the level of fluid therein.

The present device is operated by first placing an article A in chamber 11 so that port 112 is opposite the location of sleeve 40. Lever 47 is then operated to bring sealing means 44 on the inner end of the sleeve around port 112 to make a pressure tight connection. A suitable control valve (not shown) is then opened in the pressure fluid supply line 46 from the source of fluid under pressure to supply the fluid internally of the cylinder 110. Plungers 113 and 114 are, thereby, caused to move apart to the position shown in Fig. 5 and the cups 115 and 116 are pressed into sealing engagement with the interior wall of the cylinder 110. The cover 20 is next swung from its open position to a position above the face 12 of the container 10 as determined by the stop plate 29 engaging wall 15. The cam operating handle 34 may then be moved in a direction to cause cam 30 to bear upon and press the cover 20 downwardly against the sealing means 19 in opposition to the cover lifting springs 24.

When the cover 20 is located in its closed position, as described, the attendant notes the initial height of the manometer fluid in column 57 and watches for the required test period to determine if there is a change in the height. If a change occurs in the height of the column in leg 57, that is if the level L drops, it indicates the presence of a leak from the interior of the cylinder 110 to the interior of the container chamber 11. Such a leak causes an increase in the pressure in chamber 11 and a displacement of the air in the chamber toward the manometer leg 57. At the completion of the test, the control valve supplying fluid under pressure through the sleeve 40 is first closed. Thereafter, the cover 20 for the container 10 may be opened by reversing the procedure above described. Following this, the lever 47 may be operated to move the sleeve 40 away from the article A so that the article may be quickly removed from the container. It is necessary to follow this sequence of operations in order to avoid releasing the fluid under pressure into the chamber 11 before the cover 20 is released. This protects the manometer against damage due to high pressure release.

In order to achieve the maximum sensitivity from the present device, the unoccupied volume of chamber 11 or the volume which is external of the article A being tested should be held to a minimum. If the present device is constructed for testing articles having the same shape, it is quite easy to construct the container 10 with a minimum chamber volume. On the other hand, if the device is to be used for testing a number of different shaped articles, the volume of chamber 11 may be conveniently varied in order to achieve a minimum volume relationship, by the use of non-resilient filler pieces. Such filler pieces are indicated at F in Figs. 4 and 5. It is also possible to achieve a measure of sensitivity by applying a manometer tube having a bore which is small but not small enough to create an artificial level due to capillary attraction.

The present testing device fulfills the foregoing enumerated other objects of the present invention and constitutes an improvement over prior testing devices in that it makes use of a comparison of pressure values between the interior of an article to be tested and the exterior space in which the article is enclosed and sealed. It is understood that the foregoing description of a preferred embodiment is not to be taken as limiting the scope of the present invention except as it may be so required in the appended claims.

What is claimed is:

1. A device for testing for leaks in hollow articles having at least one movable pressure displaced means therein and a pressure fluid inlet port comprising a chambered container for the hollow articles to be tested, coupling means extending through a wall of said chamber and movable into sealed test pressure communication with the article in said chamber at the inlet port, said coupling means connecting the interior of the hollow test article with an external source of test fluid under pressure, cover means sealing the chamber at substantially ambient pressure conditions with the hollow test article therein, and pressure sensitive means connected with the chamber to respond to pressure changes in the chamber surrounding the hollow test article and indicate leaks in such article.

2. A device for testing for leaks in hollow articles having internally movable pressure responsive means and a pressure fluid inlet port comprising a chambered container for the hollow article to be tested, a removable member sealing the chamber from ambient pressure conditions to stabilize the pressure external to the hollow test article and within the chamber, lever operated means connected with said sealing member for removing the latter to open the chamber for removing and inserting hollow test articles, test pressure coupling means connecting a source of test fluid under pressure with the inlet port for the interior of the hollow test articles, said coupling having a sliding seal in said container for quick make and break connection with the articles to be tested, another seal on said coupling engaging the inlet port of the test article, and a manometer connected with the chamber externally of the hollow test articles to indicate pressure in the chamber.

3. A device for testing for leaks in a series of hollow articles having a pressure fluid inlet port, a container having an open sided chamber sized to receive the articles, a cover for the open side of said chamber, a pivoted arm carrying said cover and movable to permit rapid opening and closing of the chamber, a coupling connected with a source of test fluid under pressure and slidably movable through a stationary container wall into and out of sealed connection with the inlet port for each article to be tested, lever means connected with said coupling to move the same rapidly into and out of connection with the inlet port for the articles, and a manometer connected into the chamber to indicate pressure in said container external to the articles being tested.

4. A device for testing for leaks in hollow articles having internally located pressure sealing means slidable in the hollow article and pressure fluid inlet means, comprising a container having a chamber with a minimum volume in relation to the external size of the articles to be tested, cover means hermetically closing the chamber with a test article therein, movable coupling means connecting a source of test gas under pressure through the inlet means with the interior of the test article, sealing means in a wall of the chamber surrounding said coupling means and sealing the same during movement thereof, a sealing element on said coupling means surrounding the inlet means for the test article to seal against leaks around the article between said coupling means and the chamber external to the test article, and pressure sensing and indicating means connected into the chamber for response to pressure increases in the chamber due to leaks in the test article.

References Cited in the file of this patent

UNITED STATES PATENTS

| | | |
|---|---|---|
| 1,649,287 | Butler | Nov. 15, 1927 |
| 1,861,542 | McDonald et al. | June 7, 1932 |
| 2,387,743 | Cameron et al. | Oct. 30, 1945 |
| 2,573,646 | Koestering | Oct. 30, 1951 |
| 2,579,495 | Hunt | Dec. 25, 1951 |
| 2,618,152 | Kissinger | Nov. 18, 1952 |
| 2,641,126 | Maher | June 9, 1953 |